Nov. 25, 1958 S. PITT 2,861,754
APPARATUS FOR LOCATING PADS OF TAPE
MATERIAL ON A MANDREL
Filed Sept. 7, 1954
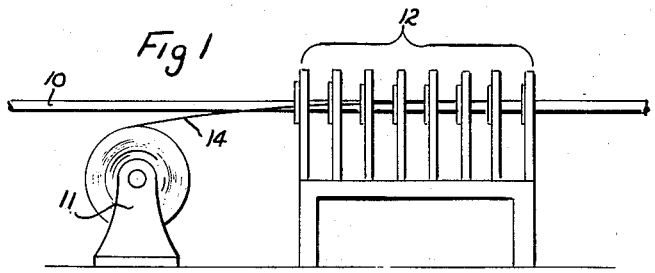
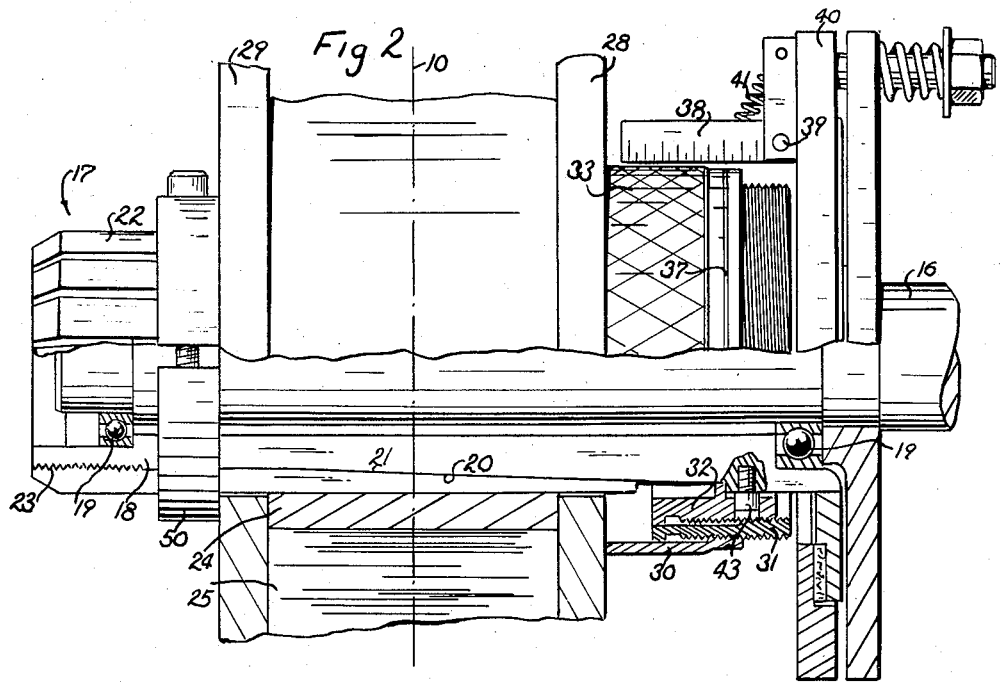
INVENTOR
SAMUEL PITT
By W.C. Parnell
ATTORNEY

United States Patent Office 2,861,754
Patented Nov. 25, 1958

2,861,754

APPARATUS FOR LOCATING PADS OF TAPE MATERIAL ON A MANDREL

Samuel Pitt, Cranford, N. J., assignor to Western Electric Company, Incorporated, New York, N. Y., a corporation of New York Application September 7, 1954, Serial No. 454,318

1 Claim. (Cl. 242—71.9)

This invention relates to apparatus for locating pads of tape material on a mandrel particularly pads of metal tape to form a sheath about a cable core.

In the manufacture of certain types of telephone cables having a final sheath of polyethylene, there are inner or intermediate layers or sheaths formed of tapes of metal such as steel and aluminum. The metal tapes are supplied in the form of wound pads which are to be mounted on a rotatable mandrel so that the centers of the pads or tapes are in general alignment with the centerline of the cable cores about which they are to be formed. The cable cores are of various sizes and, for this reason, tapes of various widths must be used, presenting a problem of mounting the pads on the mandrel so that regardless of their widths they will be centered with respect to the fixed path or centerline of the cable cores.

The object of the invention is the solution to this problem through the provision of a readily actuable and highly efficient apparatus for locating pads of tape material of various widths on a rotatable mandrel.

With this and other objects in view, the invention comprises telescoping elements disposed concentric with a rotatable mandrel and connecting an annular head to the mandrel whereby the head may be located varied distances relative to a fixed centerline to locate like sides of pads of tape of varied widths singly on the mandrel.

In the present embodiment of the invention, the telescoping elements are threadedly connected and provided with bearing members to produce a compact and highly expandable adjustable connection between the mandrel and the head which locates a pad of tape material theron. Also, an annular line on the element fixed to the head cooperates with a scale whereby the pad may be centrally aligned with the fixed centerline or the cable core.

Other objects and advantages will be apparent from the following detailed description when considered in conjunction with the accompanying drawing, wherein:

Fig. 1 is a schematic side elevational view of a cable sheathing apparatus embodying the invention;

Fig. 2 is an enlarged fragmentary side elevational view of the pad supporting unit, portions thereof being shown in section, and Fig. 3 is an enlarged fragmentary sectional view illustrating the telescoping elements in their expanded positions.

The apparatus is made a part of a cable sheathing mechanism wherein cable cores 10 of various sizes are advanced in a fixed path or centerline over a tape supply unit 11 and through a plurality of forming units 12 where a metal tape 14 is formed about the core.

The unit 11 is shown more in detail in Fig. 2 where a fixed spindle 16 carries a mandrel indicated generally at 17. The mandrel 17 includes an inner member 18 supported by bearings 19 and having a tapered surface 20 to be engaged by tapered surfaces 21 of members of an outer portion 22, threadedly adjustable at 23 on the inner member 18 and acting as a chuck to clamp a core 24 of a pad 25 of the tape 14 at any selected position on the mandrel.

The apparatus which constitutes the invention includes heads 28 and 29, particularly the means associated with the head 28 to support it and move it accurately, measured distances to assure centering of tapes 14 of various widths with the fixed centerline identified by numeral 10 the same as the cable core. There are three telescoping elements 30, 31 and 32. The element 30 is fixed in any desired manner to the head 28 and has a knurled outer surface 33 which may be gripped by the operator to rotate the element 30 with the head 28 to bring about the desired adjustments of the head. The inner surface 34 of the element 30 cooperates with a bearing portion 35 of the element 31 to add to the supporting connection between the elements in addition to the threaded connections 36. An annular line 37 in the outer surface of the element 30 is used in cooperation with a scale 38 pivotally supported at 39 on a fixed or stationary member 40, the scale being held normally vertically away from the elements by a spring 41. The inner element is fixed at 43 to the mandrel 17 and has a threaded connection 44 with the intermediate element 31 and a bearing member 45 adapted to ride on the surface 46 of the intermediate member 31.

The head 29 is provided with a collar 50 adapted to removably secure a head in position adjacent the pad 25 after the head 28 has been located relative to the centerline or core 10.

Considering now the operation of the apparatus, let it be assumed that the mandrel 17 is empty and that a pad of material of a known width is to be mounted thereon. The scale 38 is purposely marked so that each half inch and fraction thereof will indicate one inch and fractions thereof. In this manner, if the tape should be four and one-half (4½) inches wide and the operator adjusts the head 28 until the line 37 registers with the four and one-half inch mark on the scale, it will be known that the head 28 is positioned to locate the center of the pad 25 and particularly the tape 14 thereof in general alignment with the centerline of the core. This adjustment is made possible by moving the scale to the position shown in Fig. 2 and rotating the element 30 with the head 28 in the desired direction to move the line 37 to register with the four and one-half inch mark on the scale. As this requires a greater adjustment than is permitted by the element 30 alone, the threaded portion of the element 30 will be moved into engagement with the member 35 of the intermediate element 31, as shown in Fig. 3, to temporarily lock the elements 30 and 31 together so that continued rotation of the element 30 will rotate the element 31 also to move it axially of the element 32 until the full adjustment has been made. At this time, it will be known that when the pad 25 of four and one-half inch tape is placed on the mandrel and is locked in position thereon, the centerline of the tape will be positioned accurately in general alignment with the centerline 10. The head 29 with its collar 50 may be mounted on the mandrel and the cable forming mechanism may proceed to sheath the cable.

Continued requirement for tape of the same width necessitates no further adjustment of the head 28 but only removal of the head 29 to remove the core 24 and to insert successive pads of tape of the same width. However, if a core of a smaller or larger size is to be run through the machine, pads 25 of tape 14 of different sizes will be mounted on the mandrel. Prior to this mounting of the pads, the apparatus will be adjusted by relative or simultaneous rotation of the elements 30 and 31 with respect to the inner element 32 to move the line 37 into registration with a marking on the scale which corresponds to the width of the new tape, at which time, it will be known that the center of the tape will be in general alignment with the centerline 10.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

An apparatus for locating pads of tape materials of various widths centrally on a rotatable mandrel of a given length supported at right angles with respect to its center and with respect to a stationary element disposed a known distance from said center, the apparatus comprising threadedly connected telescoping members disposed concentric with the mandrel adjacent the stationary element, means to secure an inner one of the members to the mandrel adjacent the stationary member, an outer one of the members having an annular mark thereon, a scale disposed parallel with the mandrel, carried by the stationary element and for use with the annular mark, a centrally apertured disk-shaped head disposed concentric with the mandrel and fixedly secured to the outer member for free rotation therewith about the mandrel relative to the inner member to locate the head relative to the stationary element varied distances indicated by the position of the annular mark relative to the scale to cause the head to locate like sides of pads of tape of varied widths on the mandrel singly with their centers coincident with the center of the mandrel, an intermediate one of the telescoping members movable threadedly on the inner member and in the outer member to adapt the outer member to move threadedly beyond the inner member and remain supported thereby for wide range adjustment of the head, internal threads of the outermost and intermediate telescoping members being disposed in narrow enlarged portions at the ends of unthreaded inner annular surfaces thereof, and outwardly extending annular supporting bearings integral with the innermost and intermediate members and positioned respectively to ride on the unthreaded annular surfaces of the intermediate and outer members to assist in supporting said members and stop said members when abutting their respective narrow enlarged portions.

References Cited in the file of this patent

UNITED STATES PATENTS

| | | |
|---|---|---|
| 1,001,056 | Lounsberry | Aug. 22, 1911 |
| 1,223,104 | Pickett | Apr. 17, 1917 |
| 2,144,989 | Mossberg | Jan. 24, 1939 |
| 2,270,806 | Johnson | Jan. 20, 1942 |
| 2,671,618 | Kurlinski | Mar. 9, 1954 |

FOREIGN PATENTS

| | | |
|---|---|---|
| 27,502 | Great Britain | Jan. 24, 1939 |